(12) United States Patent
Ko et al.

(10) Patent No.: US 11,818,334 B2
(45) Date of Patent: Nov. 14, 2023

(54) THERMAL IMAGE-BASED TEMPERATURE MEASUREMENT CALIBRATION METHOD AND THERMAL IMAGE DEVICE

(71) Applicant: INDUSTRIAL TECHNOLOGY RESEARCH INSTITUTE, Hsinchu (TW)

(72) Inventors: Cheng Da Ko, Taipei (TW); Hung-Sheng Lin, New Taipei (TW); Chun-Te Chuang, Kaohsiung (TW); Chih-Jen Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 15 days.

(21) Appl. No.: 17/550,656

(22) Filed: Dec. 14, 2021

(65) Prior Publication Data
US 2022/0201277 A1 Jun. 23, 2022

Related U.S. Application Data

(60) Provisional application No. 63/127,038, filed on Dec. 17, 2020.

(30) Foreign Application Priority Data

Aug. 25, 2021 (TW) .................................. 110131509

(51) Int. Cl.
| | | |
|---|---|---|
| *G06T 7/00* | (2017.01) | |
| *H04N 17/00* | (2006.01) | |
| *G06T 7/80* | (2017.01) | |
| *G01J 5/53* | (2022.01) | |
| *H04N 5/33* | (2023.01) | |
| *G01J 5/00* | (2022.01) | |

(52) U.S. Cl.
CPC .............. *H04N 17/002* (2013.01); *G01J 5/53* (2022.01); *G06T 7/80* (2017.01); *H04N 5/33* (2013.01); *G01J 2005/0077* (2013.01)

(58) Field of Classification Search
CPC . H04N 17/002; H04N 5/33; G01J 5/53; G01J 2005/0077; G01J 5/0025; G01J 5/70; G01J 5/00; G06T 7/80
See application file for complete search history.

(56) References Cited

U.S. PATENT DOCUMENTS

| | | | |
|---|---|---|---|
| 7,422,365 B2 | 9/2008 | Chamberlain et al. | |
| 2019/0182439 A1* | 6/2019 | Chen | .......................... G01J 5/07 |
| 2021/0335012 A1* | 10/2021 | Shim | .......................... G01J 5/80 |

FOREIGN PATENT DOCUMENTS

| | | |
|---|---|---|
| CN | 109916517 A | 6/2019 |
| CN | 110974186 A | 4/2020 |

(Continued)

OTHER PUBLICATIONS

Taiwanese Office Action issued in corresponding application No. 110131509, dated Sep. 29, 2022.

(Continued)

*Primary Examiner* — Frank F Huang
(74) *Attorney, Agent, or Firm* — Maschoff Brennan

(57) ABSTRACT

A thermal image-based temperature measurement calibration method applicable to a thermal image device is provided. The method includes a capturing stage, a processing stage and a calibration stage. During the capturing stage, the thermal image device captures a monitored environment to obtain a measured thermal image. During the processing stage, a processor processes on the measured thermal image to obtain a target information, wherein the target information corresponds to a target in the monitored environment, and the target information includes a target image block and a target measured temperature corresponding to the target image block. During the calibration stage, the processor obtains a distance compensation value according to a pixel number of the target image block, and the processor performs a calibration operation to the target measured tem- (Continued)

perature at least according to the distance compensation value to obtain a calibrated temperature value corresponding to the target.

18 Claims, 10 Drawing Sheets

(56) References Cited

FOREIGN PATENT DOCUMENTS

| CN | 111458037 | A | 7/2020 |
|----|-----------|---|--------|
| CN | 112033545 | A | 12/2020 |
| TW | 200513053 | A | 4/2005 |
| TW | 200600056 | A | 1/2006 |
| TW | M601379 | U | 9/2020 |

OTHER PUBLICATIONS

"Enforcement Policy for Telethermographic Systems During the Coronavirus Disease 2019 (COVID-19) Public Health Emergency", U.S. Department of Health and Human Services. Apr. 2020.
"Non-contact Infrared Thermometers" FDA, Nov. 25, 2021.
"Thermal Imaging Systems (Infrared Thermographic Systems / Thermal Imaging Cameras)" FDA, Nov. 25, 2021.
Taiwan Office Action dated Jan. 7, 2023 as received in application No. 110131509.

* cited by examiner

THERMAL IMAGE-BASED TEMPERATURE MEASUREMENT CALIBRATION METHOD AND THERMAL IMAGE DEVICE

CROSS-REFERENCE TO RELATED APPLICATIONS

This non-provisional application claims priority under 35 U.S.C. § 119(e) on provisional application No(s). 63/127,038 filed in U.S.A. on Dec. 17, 2020, and on patent application No(s). 110131509 filed in Taiwan on Aug. 25, 2021, the entire contents of which are hereby incorporated by reference.

BACKGROUND

1. Technical Field

The present disclosure relates to temperature measurement, and more particular to a thermal image-based temperature measurement calibration method and thermal image device.

2. Related Art

The Coronavirus disease 2019 (COVID-19) has become a highly infectious and fatal virus in recent years, and one of the common symptoms of patients is fever. In order to avoid the spread of the epidemic, medical institutions and public places need to be conducted with temperature control. The slow speed of measuring human forehead temperatures can easily lead to queuing at the entrance, which greatly increases the demand for the labor force for detection. In addition, common temperature measurement kits such as forehead thermometers or ear thermometers cannot perform rapid, non-contacting measurement due to the necessity for contacting the human body, and may even increase the risk of infection due to the close distance between the measurer and the subject to be measured.

Although non-contact temperature measurement tools such as thermal image devices can provide rapid detection and reduce labor costs, so far the accuracy is still not good enough. For example, when the distance between the human body and the thermal image device changes, the difference between measured temperatures can be extremely large. In addition, in a multi-personal environment, there are multiple heat sources in the thermal image generated by the thermal image device. It is difficult to accurately identify which heat sources belong to the human body heat. The above factors make the existing thermal image device unable to accurately detect body temperatures under a large people flow.

SUMMARY

According to an embodiment of the present disclosure, a thermal image-based temperature measurement calibration method, comprising: a capturing stage, capturing image, by a thermal image camera, at a monitored environment to obtain a measured thermal image; a processing stage, processing, by a processor, on the measured thermal image to obtain a target information, wherein the target information corresponds to a target in the monitored environment, and the target information comprises a target image block and a target measured temperature corresponding to the target image block; and a calibration stage, obtaining, by the processor, a distance compensation value according to a pixel number of the target image block, and performing, by the processor, a calibration operation on the target measured temperature to obtain a calibrated temperature value corresponding to the target according to at least the distance compensation value.

According to an embodiment of the present disclosure, a thermal image device comprising: a thermal image camera capturing image at a monitored environment to obtain a measured thermal image; and a processor electrically connecting to the thermal image camera, wherein: the processor process on the measured thermal image to obtain a target information, the target information corresponds to a target in the monitored environment, and the target information comprises a target image block and a target measured temperature corresponding to the target image block; the processor obtains a distance compensation value according to a pixel number of the target image block, and the processor performs a calibration operation on the target measured temperature to obtain a calibrated temperature value corresponding to the target according to at least the distance compensation value.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
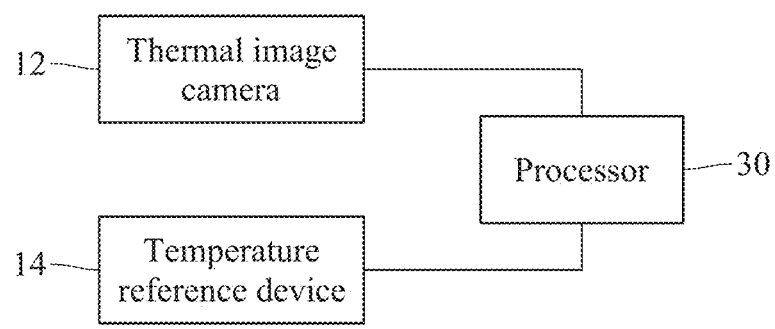
FIG. 1 is a block diagram of a thermal image device according to an embodiment of the present disclosure.
Figure 2:
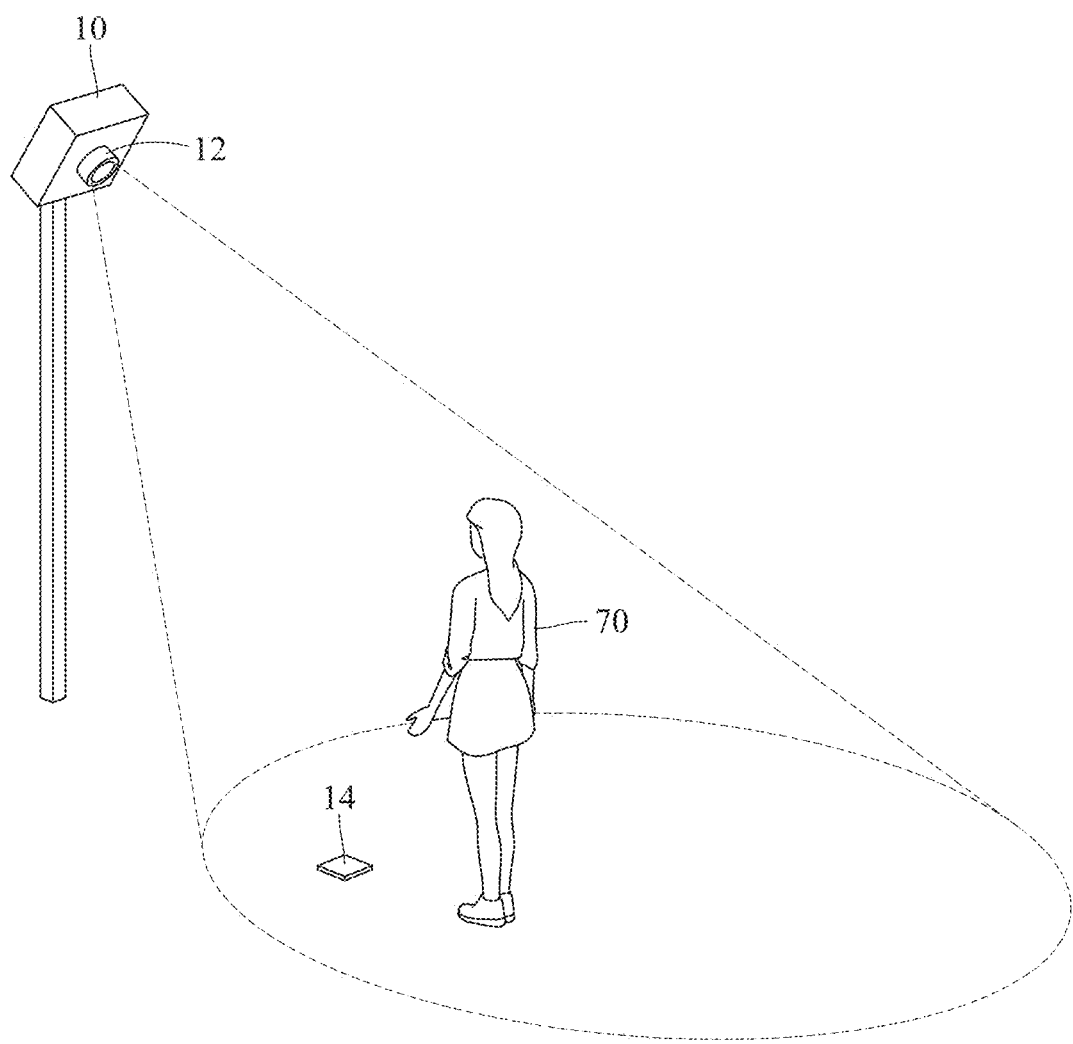
FIG. 2 is a schematic diagram of the thermal image device, a monitored environment, and the target according to an embodiment of the present disclosure.

FIG. 1 is a block diagram of a thermal image device 10 according to an embodiment of the present disclosure. The thermal image device 10 comprises a thermal image camera 12, a temperature reference device 14, and a processor 30. The processor 30 is electrically connected to the thermal image camera 12 and the temperature reference device 14. FIG. 2 is a schematic diagram, which shows the thermal image device 10, the monitored environment and the target 70 according to an embodiment of the present disclosure. The thermal image device 10 is applicable to measure a temperature of the target 70 in the monitored environment, such as the body temperature of people around the entrance of public places, and to calibrate the measured temperature. The monitored environment may be, for example, the place where the thermal image camera 12 is capable to capture images, such as the area marked with a dashed line in FIG. 2.

The thermal image camera 12 captures image at the monitored environment to generate the measured thermal image. The measured thermal image has a plurality of pixels, and each pixel value represents a temperature measured at the position corresponding to the pixel. In practice, the measured thermal image can be converted into a gray scale picture to view the temperature distribution in the monitored environment. The thermal image camera 12 may be, for example, an infrared camera, however, the present disclosure is not limited thereto.

The temperature reference device 14 is disposed in the monitored environment. The temperature reference device 14 is controlled to remain in a specified reference temperature. The specified reference temperature should be higher than the temperature of the monitored environment, and fall within the expected temperature range of the target 70. For example, the normal forehead temperature ranges from 35 degrees Celsius to 37 degrees Celsius, so that the specified reference temperature may be set to 36 degrees Celsius. The temperature reference device 14 comprises a heat radiating element arranged to remain in the specified reference temperature and a controller controlling the temperature of the heat radiating element. The controller may be, for example, a heater, or a device having a cooling function.

Figure 3:
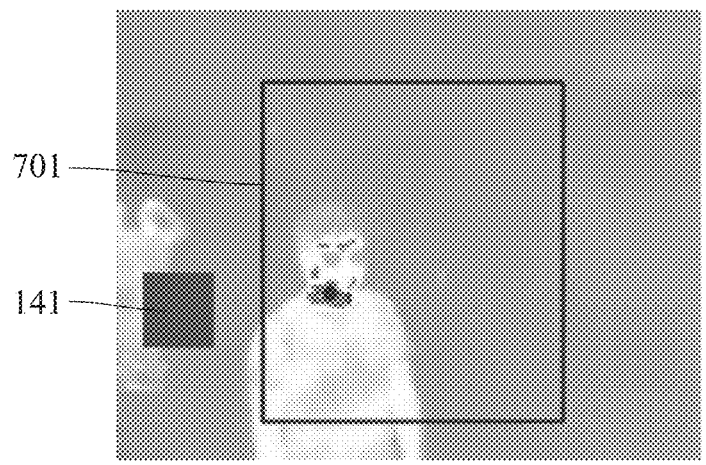
FIG. 3 is an example of thermal image that the temperature reference device and the thermal image camera adopt a separate design.
Figure 4:
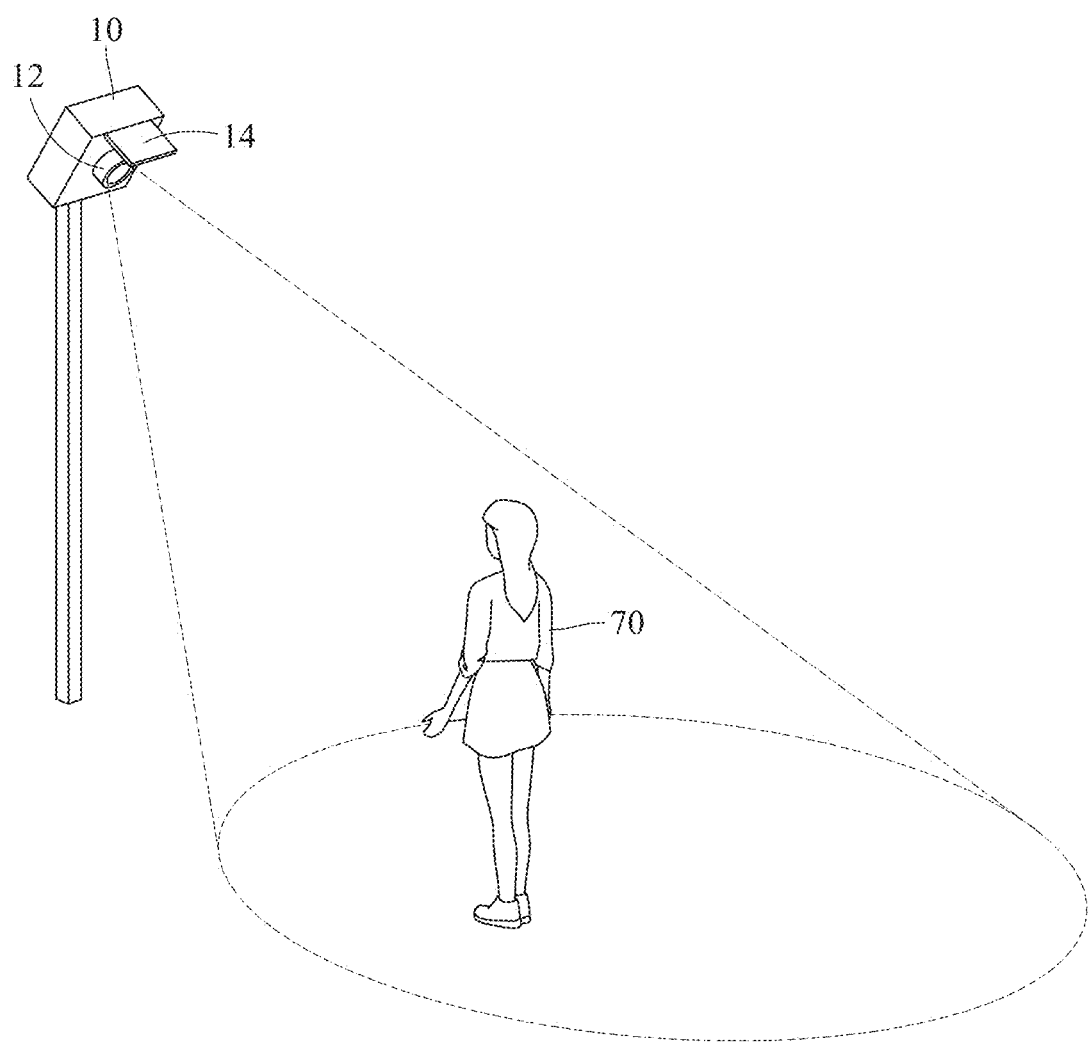
FIG. 4 is a schematic diagram that the temperature reference device and the thermal image camera adopt an integrated design.
Figure 5:
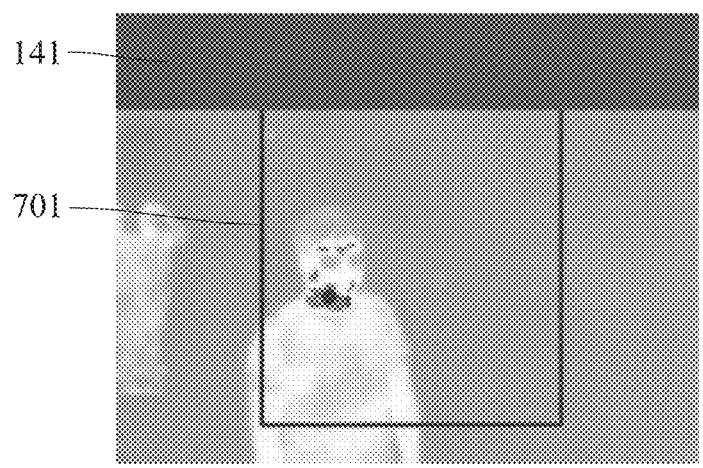
FIG. 5 is an example of thermal image that the temperature reference device and the thermal image camera adopt an integrated design.
Figure 6:
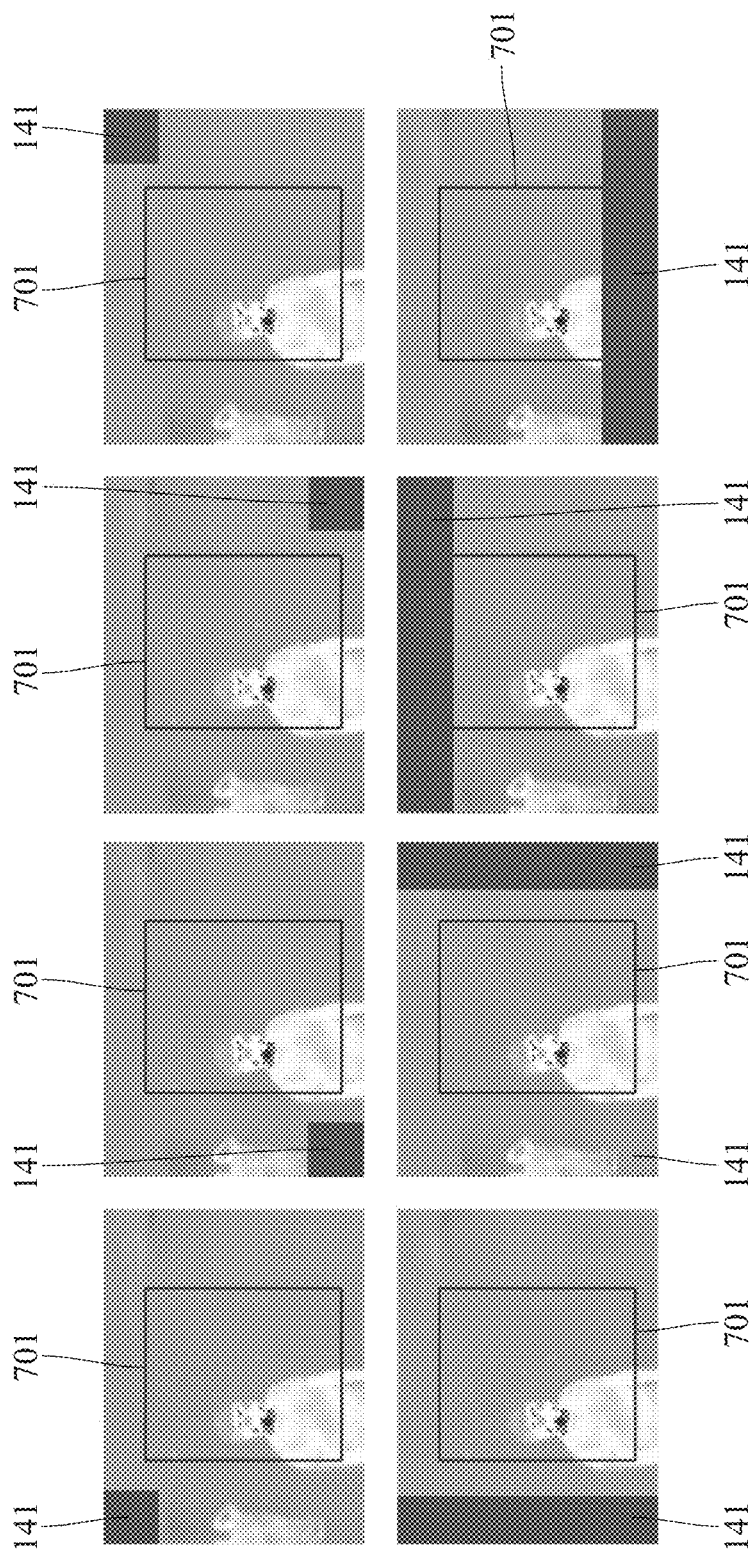
FIG. 6 shows other examples of thermal images that the temperature reference device and the thermal image camera adopt an integrated design.

The temperature reference device 14 and the thermal image camera 12 may be practiced by adopting a separate design or an integrated design. These two designs are distinguished by the distance between the temperature reference device 14 and the thermal image camera 12. The integrated design requires the distance be greater than a default value, while the separate design requires the distance be smaller than the default value. The separate design is shown in FIG. 2, and the measured thermal image taken in a separate design is shown in FIG. 3. In FIG. 3, the reference image block 141 corresponds to temperature reference device 14, and the target image block 701 corresponds to the target 70. The integrated design is shown as FIG. 4, the temperature reference device 14 is disposed near the top of the thermal image camera 12, so that the reference image block 141 is located at the top of the measured thermal image as shown in FIG. 5. The present disclosure does not limit the disposed position of the temperature reference device 14 in the integrated design, for example, the temperature reference device 14 can be set in the upper left corner, lower left corner, lower right corner, upper right corner, left side, right side, upper side or lower side of the lens of the thermal image camera 12, and the positions of the measured thermal image and the reference image block 141 taken in the integrated design of the above examples is shown in FIG. 6.

The processor 30 performs an operation to obtain a reference information and a target information according to the measured thermal image. The reference information corresponds to the temperature reference device 14, and the reference information comprises a reference image block 141 and a reference measured temperature a corresponding to the reference image block 141. The target information corresponds to the target 70, and the target information comprises a target image block 701 and a target measured temperature corresponding to the target image block 701. The processor 30 performs a calibration operation to generate a calibrated temperature value of the target 70 according to the reference information, the target information, and the specified reference temperature. The details of the calibrated temperature value generated by the processor 30 are described below using the thermal image-based temperature measurement calibration method according to an embodiment of the present disclosure.

Figure 7:
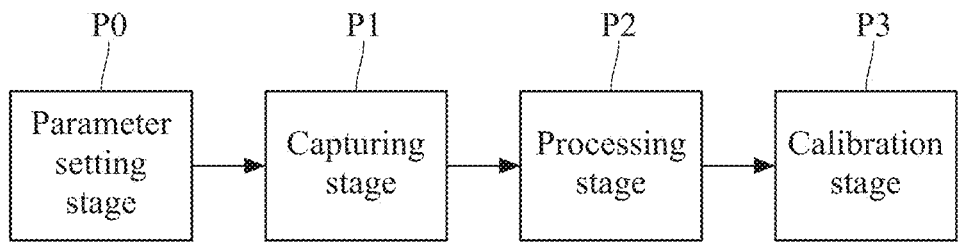
FIG. 7 is a flow chart of the thermal image-based temperature measurement calibration method according to an embodiment of the present disclosure.

FIG. 7 is a flow chart of the thermal image-based temperature measurement calibration method according to an embodiment of the present disclosure, and the method comprises a parameter setting stage P0, a capturing stage P1, a processing stage P2, and a calibration stage P3.

Before the thermal image device 10 according to an embodiment of the present disclosure is put into actual practice, the parameter setting stage P0 may be performed for several times to establish the distance compensation table for subsequent use in calibrating the measured temperature. The distance compensation table records a plurality of mapping relationships between a plurality of compared pixel numbers and a plurality of default distance compensation values. The following Table 1 is an example of the distance compensation table. The distance compensation table may have a plurality of rows, and a default area (i.e., the compared pixel number), a default distance, and a distance compensation value (i.e., the default distance compensation values) are recorded in each row.

TABLE 1

| Default Area ($A_0$) | Default Distance (D) | Distance compensation value ($\Delta T_{dis}$) |
|---|---|---|
| 81 pixels | 3.0 meters | 0.1° C. |
| 64 pixels | 3.2 meters | 0.5° C. |
| 49 pixels | 3.4 meters | 1.0° C. |

Figure 8:
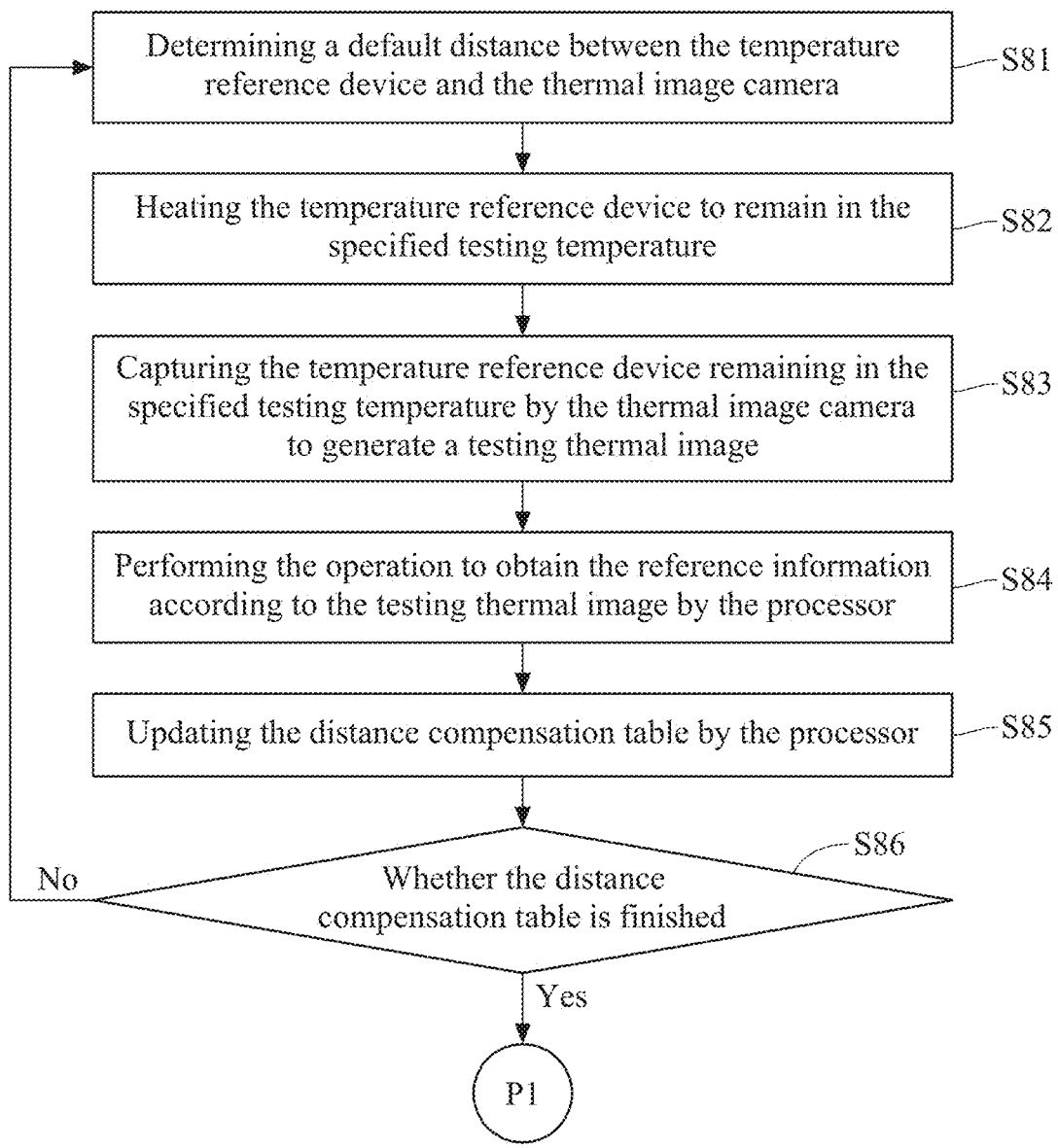
FIG. 8 is a flow chart of establishing the distance compensation table in the parameter setting stage.

FIG. 8 is a flow chart of establishing the distance compensation table in the parameter setting stage P0. Step S81 represents "determining a default distance between the temperature reference device and the thermal image camera". The default distance may be, for example, 3.0 meters, 3.2 meters, or 3.4 meters as shown in Table 1. Step S82 represents "heating the temperature reference device to remain in the specified testing temperature". Specifically, the temperature reference device 14 is heated to the specified testing temperature, wherein the specified testing temperature should be higher than the temperature of the monitored environment, such as the room temperature, and should be within the expected temperature range of the target 70, such as the human body temperature. Step S83 represents "capturing the temperature reference device remaining in the specified testing temperature by the thermal image camera to generate a testing thermal image". Step S84 represents "performing the operation to obtain the reference information according to the testing thermal image by the processor". The reference information corresponds to the temperature reference device 14, and comprises a reference image block 141 and a reference measured temperature. The reference image block 141 is an image block composed of multiple pixels corresponding to the temperature reference device 14 in the testing thermal image, the reference measured temperature is a temperature value calculated according to multiple pixel values of the reference image block 141. The present disclosure does not limit the calculation method of the reference measured temperature. For example, the average (or the maximum) of the pixel values of the reference image block 141 may be set as the reference measured temperature. The first example of Step S84 is to manually define the specific position in the testing thermal image as the reference image block 141. For example, in FIG. 5, the user may designate the specific area on the top of the testing thermal image to serve as the reference image block 141. The second example of Step S84 is that the processor 30 automatically detects the reference image block 141 in the testing thermal image.

Figure 9:
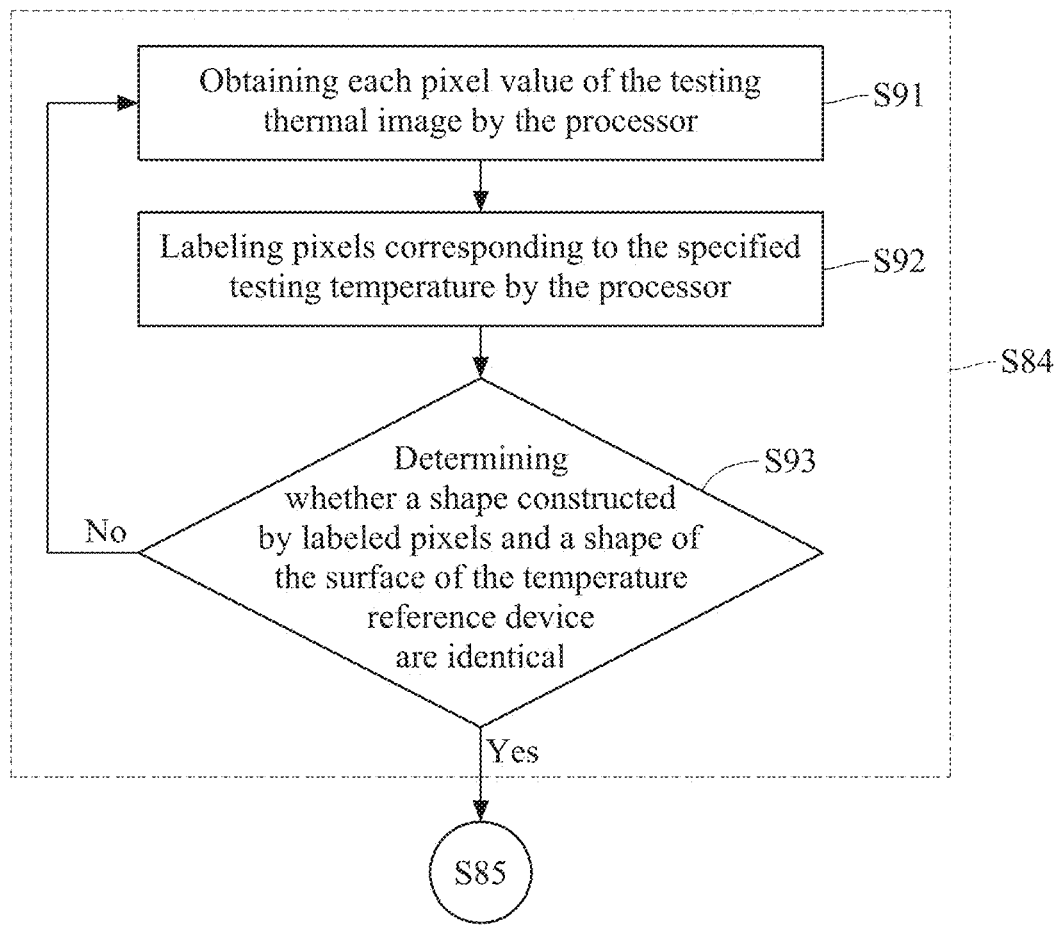
FIG. 9 is a flow chart of the second example of a step in FIG. 8.

FIG. 9 is a flow chart of the second example of Step S84. The temperature reference device 14 has a surface remaining in the specified testing temperature, and this surface is captured by the thermal image camera 12. Therefore, the processor 30 may detect multiple pixels corresponding to the surface in the testing thermal image. Step S91 represents "obtaining each pixel value of the testing thermal image by the processor". Each pixel value represents a temperature measured at the corresponding position of the pixel. Step S92 represents "labeling pixels corresponding to the specified testing temperature by the processor". In other words, the processor 30 detects whether each pixel value of the testing thermal image corresponds to the specified testing temperature. The processor 30 labels the pixel when the detection is "yes", and does not label the pixel when the detection is "no". Step S93 represents "determining whether a shape constructed by labeled pixels and a shape of the surface of the temperature reference device are identical". A positive determination means that the processor 30 finds the reference image block 141 in the testing thermal image, and then the processor 30 records positions of these pixels corresponding to the specified testing temperature, and sets these pixels as the reference image block 141.

Please refer to FIG. 8. Step S85 represents "updating the distance compensation table by the processor". Specifically, the processor 30 updates the distance compensation table according to the testing reference information. The processor 30 sets the area of the reference image block 141 obtained in Step S84 as the default area, and sets the difference value between the reference measured temperature and the specified testing temperature as the default distance compensation value. For example, the area calculation method of the reference image block 141 may adopt the pixel number, or the processor 30 calculates the area according to the shape of the reference image block 141, but the present disclosure does not limit thereto. The reference measured temperature is usually lower than the specified testing temperature, since the airflow in the environment where the temperature reference device 14 is located will take away the heat radiated from the temperature reference device 14.

Step S86 represents that the processor 30 determines "whether the distance compensation table is finished". For example, if the distance between the target 70 expected to be measured is 3 to 4 meters from the thermal image camera 12, and the interval between two default distances is 0.2 meters, the distance compensation table will have 6 rows, and the default distances corresponding to these 6 rows are: 3 meters, 3.2 meters, 3.4 meters, 3.6 meters, 3.8 meters, and 4 meters, respectively. The numbers used in the above example are for illustrative purposes rather than limiting the present disclosure. If the distance compensation table is established, the capturing stage P1 in FIG. 7 will be performed subsequently; otherwise, Step S81 is performed to choose another default distance and then the flow of steps S82-S84 will be repeated.

Figure 10:
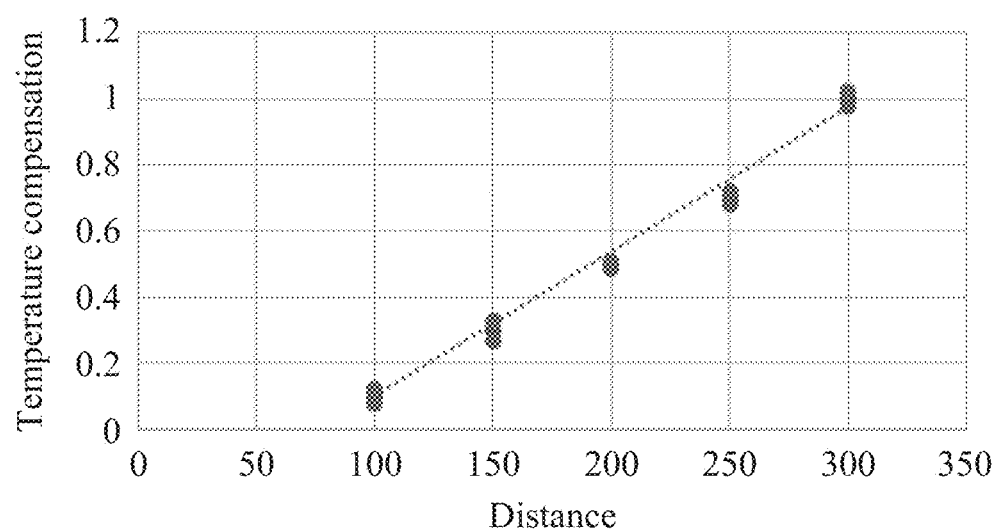
FIG. 10 shows a curve corresponding to the distance compensation function.

In practice, the flow of FIG. 8 can be adaptively modified so that the establishment of distance compensation table is changed to the establishment of the distance compensation function. For example, multiple default distances are selected in Step S81, and multiple testing thermal images are captured according to these default distances in steps S82-S84. The processor 30 further calculates multiple distance compensation values, and then establishes the distance compensation function with a curve fitting method according to these default distances and these distance compensation values. The curve corresponding to the distance compensation function is shown in FIG. 10. Specifically, the temperature reference device 14 heats to the specified testing temperature. The distance between the temperature reference device 14 and the thermal image camera 12 is adjusted to a first default distance; the thermal image camera 12 captures the temperature reference device 14 to generate the first testing thermal image. The processor 30 performs the operation to obtain the first reference information according to the first testing thermal image, wherein the first reference information corresponds to the temperature reference device and the first default distance, and comprises the first reference image block and a first reference measured temperature. The processor 30 calculates a first default distance compensation values, wherein the first default distance compensation values is a difference value between the first reference measured temperature and the specified testing temperature. The distance between the temperature reference device 14 and the thermal image camera 12 is adjusted to a second default distance. The thermal image camera 12 captures the temperature reference device 14 to generate the second testing thermal image. The processor 30 image performs the operation to obtain the second reference information according to the second testing thermal, wherein the second reference information corresponds to the temperature reference device 14 and the second default distance, and comprises the second reference image block and the second reference measured temperature. The processor 30 calculates a second default distance compensation values, wherein the second default distance compensation values is a difference value between the second reference measured temperature and the specified testing temperature. The processor 30 performs the curve fitting operation to generate a distance compensation function according to a pixel number of the first reference image block, a pixel number of the second reference image block, the first default distance compensation values, and the second default distance compensation values. In an embodiment, the processor 30 sums the target measured temperature and the distance compensation value to obtain the calibrated temperature value.

Figure 11:
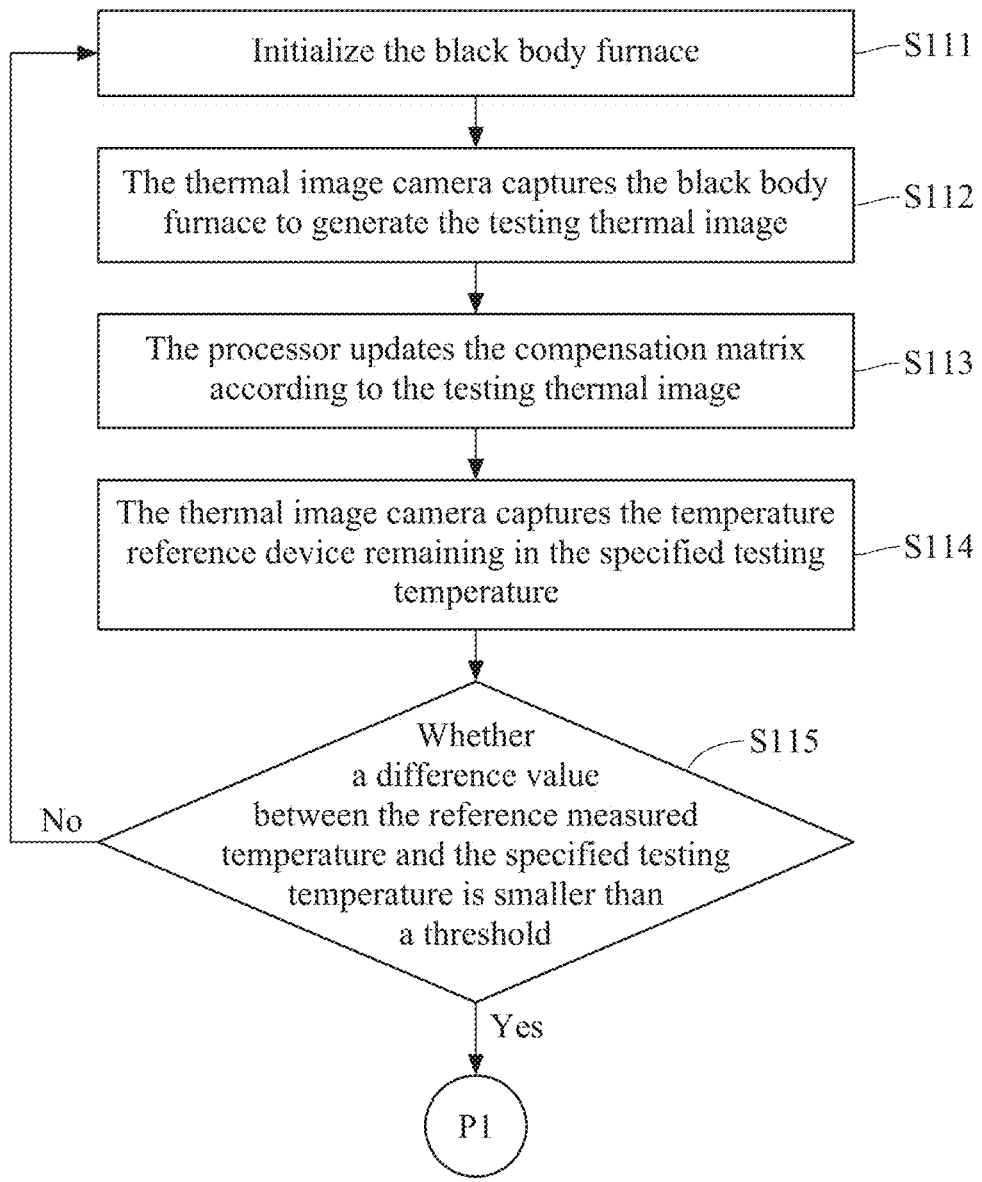
FIG. 11 is a flow chart of performing a the full-plane temperature self-calibration on the thermal camera.

A flow of the full-plane temperature self-calibration may be performed in the parameter setting stage P0 in order to enhance the measurement accuracy of the thermal image camera 12. Please refer to FIG. 11: Step S111 represents "initializing the black body furnace". For example, the black body furnace is set to 37 degrees Celsius. Step S112 represents "the thermal image camera captures the black body furnace to generate the testing thermal image". Step S113 represents "the processor updates the compensation matrix according to the testing thermal image", since the surface of the black body furnace is larger than that of the temperature reference device 14, and the heat radiation of the black body furnace is stable, every pixel value corresponding to the black body furnace in the testing thermal image is theoretically identical, e.g., all the pixels may present 37 degrees Celsius. Therefore, once the processor 30 finds a certain pixel value different from the initialization temperature of the black body furnace, the processor 30 will record this difference value between this pixel value and the initialization temperature of the black body furnace in the compensation matrix, wherein elements of the compensation matrix correspond to the pixels of the testing thermal image respectively. Step S114 represents "the thermal image camera captures the temperature reference device remaining in the specified testing temperature". Step S115 represents that the processor 30 determines "whether a difference value between the reference measured temperature and the specified testing temperature is smaller than a threshold" according to the compensation matrix. If the determination of Step S115 is "yes", it means that the thermal image camera 12 has finished the full-plane temperature self-calibration. The updated compensation matrix will be stored in the thermal image camera 12, and will be repeatedly used by the thermal image camera 12 when the capturing stage P1 is performed as shown in FIG. 7. On the other hand, if the determination of Step S115 is "no", the flow returns to Step S11 for re-calibration.

Please refer to FIG. 7, the entire flow from the capturing stage P1 to the processing stage P2 to the calibration stage P3 is equivalent to applying the thermal image device 10 according to an embodiment of the present disclosure to the monitored environment. During the capturing stage P1, the thermal image device 10 captures the monitored environment to generate the measured thermal image, wherein the target 70 and the temperature reference device 14 are in the monitored environment. During the processing stage P2, the processor 30 performs the operation to obtain the target information and the reference information according to the measured thermal image, wherein the target information corresponds to the target 70 in the monitored environment, the target information comprises a target image block 701 and a target measured temperature corresponding to the target image block 701, the reference information corresponds to the temperature reference device 14, and the reference information comprises a reference image block 141 and a reference measured temperature corresponding to the reference image block 141.

During the processing stage P2, when the processor 30 performs the operation to obtain the reference information according to the measured thermal image, this operation comprises the following steps: the processor 30 performs the operation on the measured thermal image to obtain at least one candidate reference block of the measured thermal image, wherein a difference value between a temperature of each candidate reference block and the specified reference temperature is smaller than or equal to the threshold; the processor 30 compares a shape of at least one candidate reference block with a shape of the heat radiating element to determine one of the said at least one candidate reference block to be the reference image block 141; and the processor 30 calculates the reference measured temperature according to a pixel value of the reference image block 141. The present disclosure does not limit the value of the threshold. In an embodiment, the temperature of the candidate reference block may be, for example, an average of temperatures of all pixels in the candidate reference block.

During the calibration stage P3, the processor 30 performs the calibration to generate the calibrated temperature value of the target 70 according to the target information and the compensation value (which includes the environment compensation value and the distance compensation value). In other words, the processor 30 performs the calibration operation on the target measured temperature to generate the calibrated temperature value corresponding to the target 70 according to at least the distance compensation value. In an embodiment, the processor 30 sums the target measured temperature, the environment compensation value, and the distance compensation value to generate the calibrated temperature value. In another embodiment, the processor 30 sums the target measured temperature and the distance compensation value to obtain the calibrated temperature value.

In an embodiment of the calibration stage P3, the processor 30 calculates the calibrated temperature value according to the following Equation 1.

$$T_{cal}=T_o+\Delta T_{dis}(D(A_o))+T_{offset} \quad \text{(Equation 1)},$$

wherein, $T_{cal}$ is the calibrated temperature value, $T_o$ is the target measured temperature, $\Delta T_{dis}(D(A_o))$ is the distance compensation value, and $T_{offset}$ is the environment compensation value o During the processing stage P2, the processor 30 performs the operation to obtain the target measured temperature $T_o$ and the reference measured temperature according to the measured thermal image operation, and the processor 30 calculates the difference value between the reference measured temperature and the specified reference temperature to serve as the environment compensation value $T_{offset}$. The present disclosure takes the relationship between the actual temperature of the temperature reference device 14 and the measured temperature to reflect the affection of the temperature measurement in the monitored environment, and compensates to the calibrated temperature value $T_{cal}$ for the affection.

During the processing stage P2, the processor 30 performs the operation to obtain the target image block 701 according to the measured thermal image. In an embodiment, the processor 30 looks up the distance compensation table to obtain the distance $D(A_o)$ between the target 70 and the thermal image camera 12 according to the area $A_0$ of the target image block 701, and further obtains the distance compensation value $\Delta T_{dis}(D(A_o))$ corresponding to the distance $D(A_0)$. In another embodiment, the processor 30 inputs the area $A_o$ of the target image block 701 to the distance compensation function, and the output of the distance compensation function is the distance compensation value $\Delta T_{dis}(D(A_o))$. In other words, the processor 30 performs the operation to obtain the distance compensation value according to the pixel number of the target image block 701 and the distance compensation function, wherein the distance compensation function is a fitting curve of multiple compared pixel numbers and multiple default distance compensation values.

In an embodiment of the calibration stage P3, the processor 30 sums the distance compensation value $\Delta T_{dis}(D(A_o))$ and the environment compensation value $T_{offset}$ to serve as the compensation value, and sums the target measured temperature $T_o$ and the compensation value to serve as the calibrated temperature value $T_{cal}$.

In another embodiment of the calibration stage P3, the compensation value only uses one of the distance compensation value $\Delta T_{dis}(D(A_o))$ and the environment compensation value $T_{offset}$. For example, the compensation value is taken as the environment compensation value when the distance compensation table or the distance compensation function is not used. The compensation is taken as the distance compensation value when the temperature reference device 14 is not used.

In practice, when the calibrated temperature value calculated by the processor 30 is greater than a default value, the processor 30 may issue an alert signal, and the alarm signal may be sent to a display device or a loudspeaker device to notify relevant personnel to deal with issues.

Figure 12:
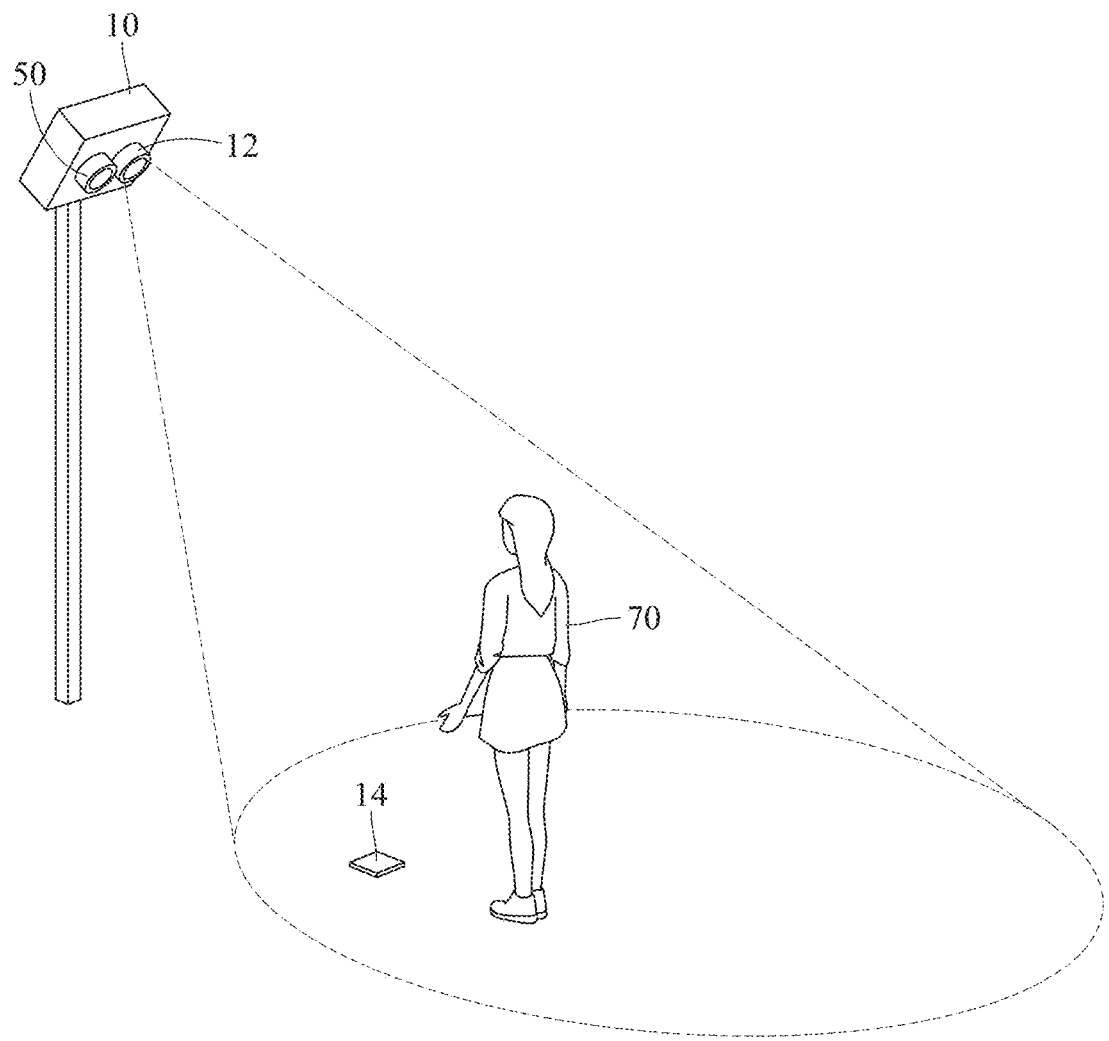
FIG. 12 is a schematic diagram of the thermal device adopting the integrated design according to another embodiment of the present disclosure.
Figure 13:
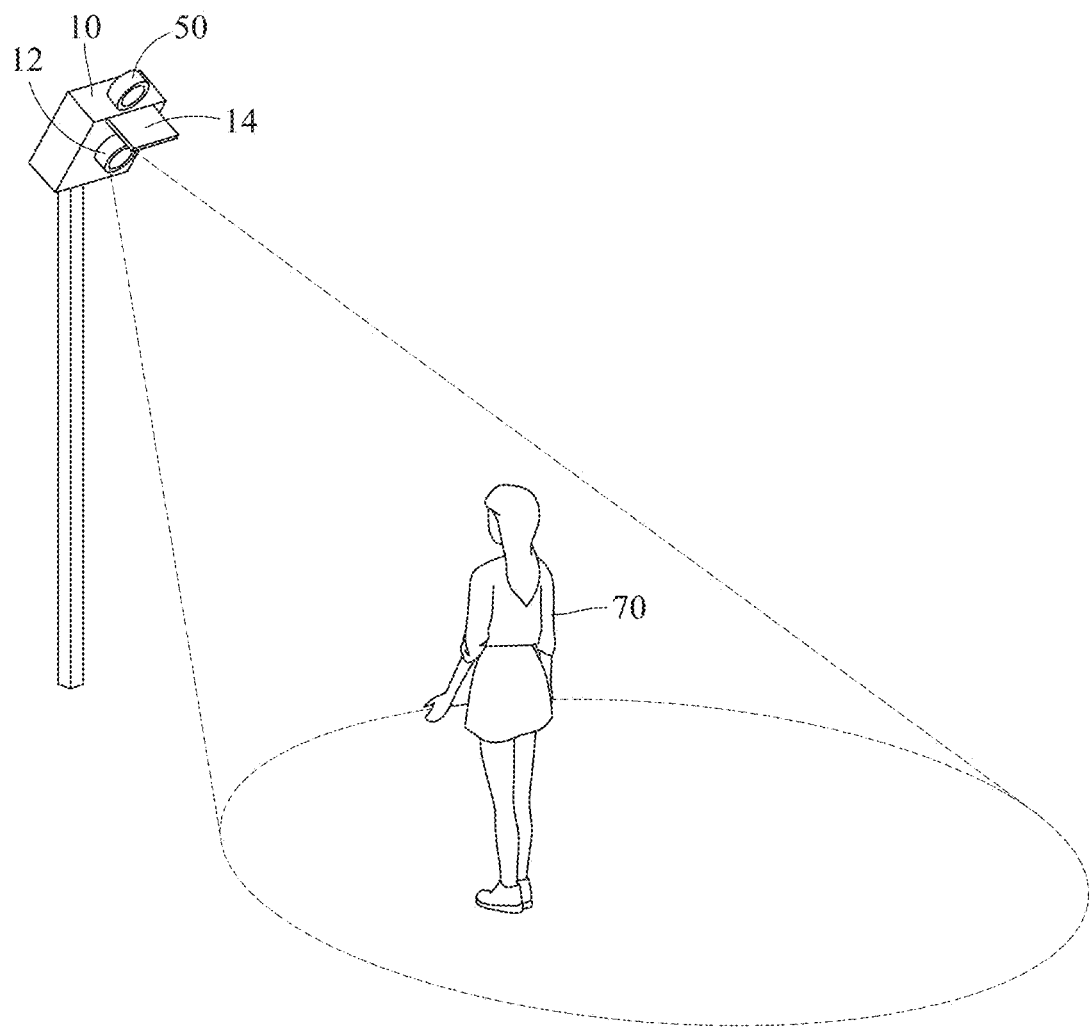
FIG. 13 is a schematic diagram of the thermal device adopting the separate design according to another embodiment of the present disclosure.

In another embodiment of the present disclosure, the thermal image device 10 further comprises a visible-light camera 50 electrically connecting to the processor 30. During the capturing stage P1, the visible-light camera 50 captures the monitored environment to generate an optical image. During the processing stage P2, the processor 30 may perform the operation to determine a range of the target image block 701 according to the optical image, the thermal image and an object recognition model. The recognition accuracy of the target image block 701 may be further enhanced through the object recognition model. FIG. 12 and FIG. 13 are diagrams showing a separate design and an integrated design regarding the thermal image device 10 having the visible-light camera 50. The object recognition model may be trained by collecting the testing thermal images and labeling object features. In practice, the thermal image camera 12 inputs the measured thermal image to the object recognition model, and the object recognition model labels the features and outputs the measured thermal image for the subsequent processing. The object recognition model may be "You Only Look Once" (YOLO) image recognition model or an ellipse fitting algorithm form human body contour, but the present disclosure does not limit thereto, however. The object recognition model may be trained or constructed using the historical data according to the operating environment.

In view of the above, the present disclosure utilizes the measured temperature of the temperature reference device and the actual temperature of the temperature reference device to calculate the environment compensation value, and utilizes the thermal image itself to calculate the distance compensation value. By using the above two compensation values, the present disclosure can enhance the accuracy of the temperature calibration. Moreover, the present disclosure may detect multiple temperatures of multiple targets by a low-cost temperature reference device rather than an expensive distance sensor, wherein these targets are of different distances apart from the thermal image camera. The present disclosure can quickly measure the body temperature of multiple people in a multi-personal environment, and quickly locate the person with an abnormal body temperature. The present disclosure uses non-contact measurement, which has both advantages of high accuracy and low cost.

What is claimed is:

1. A thermal image-based temperature measurement calibration method, comprising:
    a capturing stage, capturing image, by a thermal image camera, at a monitored environment to obtain a measured thermal image;
    a processing stage, processing, by a processor, on the measured thermal image to obtain a target information, wherein the target information corresponds to a target in the monitored environment, and the target information comprises a target image block and a target measured temperature corresponding to the target image block; and
    a calibration stage, obtaining, by the processor, a distance compensation value according to a pixel number of the target image block, and performing, by the processor, a calibration operation on the target measured temperature to obtain a calibrated temperature value corresponding to the target according to at least the distance compensation value;
    wherein the capturing stage further comprises heating a temperature reference device to a specified reference temperature;
    the processing stage further comprises processing, by the processor, on the measured thermal image to obtain a reference information corresponding to the temperature reference device, wherein the reference information comprises a reference image block and a reference measured temperature corresponding to the reference image block; and
    the calibration stage further comprises calculating, by the processor, an environment compensation value according to the specified reference temperature and the reference measured temperature, wherein the calibrated temperature value is generated by the processor performing the calibration operation on the target measured temperature according to the distance compensation value and the environment compensation value;
    wherein the processor further stores a distance compensation table recording a plurality of mapping relationships between a plurality of compared pixel numbers and a plurality of default distance compensation values; and obtaining the distance compensation value according to the pixel number of the target image block by the processor comprises looking up, by the processor, the pixel number of the target image block in the distance compensation table, to determine one of the plurality of default distance compensation values to serve as the distance compensation value.

2. The thermal image-based temperature measurement calibration method of claim 1, wherein the processor sums the target measured temperature, the distance compensation value and the environment compensation value to obtain the calibrated temperature value.

3. The thermal image-based temperature measurement calibration method of claim 1, wherein the temperature reference device comprises a heat radiating element arranged to remain in the specified reference temperature, and a heater arranged to heat the heat radiating element; and processing on the measured thermal image to obtain the reference information by the processor in the processing stage comprises:
    processing, by the processor, on the measured thermal image to obtain at least one candidate reference block of the measured thermal image, wherein a difference between a temperature of each candidate reference block and the specified reference temperature is smaller than or equal to a threshold;
    comparing, by the processor, a shape of said at least one candidate reference block with a shape of the heat radiating element to determine one of said at least one candidate reference block as the reference image block; and
    calculating, by the processor, the reference measured temperature according to a pixel value of the reference image block.

4. The thermal image-based temperature measurement calibration method of claim 1, wherein the processor sums the target measured temperature and the distance compensation value to obtain the calibrated temperature value.

5. The thermal image-based temperature measurement calibration method of claim 1, further comprising a parameter setting stage, wherein the parameter setting stage comprises:
heating the temperature reference device to a specified testing temperature, wherein a distance between the temperature reference device and the thermal image camera is a default distance;
capturing image, by the thermal image camera, at the temperature reference device to obtain a testing thermal image;
processing, by the processor, on the testing thermal image to obtain a testing reference information corresponding to the temperature reference device, wherein the testing reference information comprises a reference image block and a reference measured temperature; and
updating, by the processor, the distance compensation table according to the testing reference information, wherein a pixel number of the reference image block is one of the plurality of compared pixel numbers, and a difference value between the reference measured temperature and the specified testing temperature is one of the plurality of default distance compensation values.

6. The thermal image-based temperature measurement calibration method of claim 1, wherein the capturing stage further comprises capturing image, by a visible-light camera, at the monitored environment to obtain an optical image, and the processing stage further comprises performing, by the processor, operation to determine the target image block according to the thermal image, the optical image and an object recognition model.

7. The thermal image-based temperature measurement calibration method of claim 1, wherein obtaining the distance compensation value according to the pixel number of the target image block by the processor comprises:
performing, by the processor, operation to obtain the distance compensation value according to the pixel number of the target image block and a distance compensation function;
wherein the distance compensation function is a fitting curve representing a plurality of compared pixel numbers and a plurality of default distance compensation values.

8. The thermal image-based temperature measurement calibration method of claim 7, wherein the processor sums the target measured temperature and the distance compensation value to obtain the calibrated temperature value.

9. The thermal image-based temperature measurement calibration method of claim 7, further comprising a parameter setting stage, and the parameter setting stage comprises:
heating a temperature reference device to a specified testing temperature;
adjusting the distance between the temperature reference device and the thermal image camera to a first default distance;
capturing image, by the thermal image camera, at the temperature reference device to obtain a first testing thermal image;
processing, by the processor, on the first testing thermal image to obtain a first reference information, wherein the first reference information corresponds to the temperature reference device and the first default distance, and the first reference information comprises a first reference image block and a first reference measured temperature;
calculating, by the processor, a first default distance compensation value, wherein the first default distance compensation value is a difference value between the first reference measured temperature and the specified testing temperature;
adjusting the distance between the temperature reference device and the thermal image camera to a second default distance;
capturing image, by the thermal image camera, at the temperature reference device to obtain a second testing thermal image;
processing, by the processor, on the second testing thermal image to obtain a second reference information, wherein the second reference information corresponds to the temperature reference device and the second default distance, and the second reference information comprises a second reference image block and a second reference measured temperature;
calculating, by the processor, a second default distance compensation value, wherein the second default distance compensation value is a difference value between the second reference measured temperature and the specified testing temperature; and
performing, by the processor, a curve fitting operation to obtain the distance compensation function according to a pixel number of the first reference image block, a pixel number of the second reference image block, the first default distance compensation value, and the second default distance compensation value.

10. A thermal image device comprising:
a thermal image camera capturing image at a monitored environment to obtain a measured thermal image;
a processor electrically connecting to the thermal image camera, and configured to: process on the measured thermal image to obtain a target information, wherein the target information corresponds to a target in the monitored environment, and the target information comprises a target image block and a target measured temperature corresponding to the target image block; obtain a distance compensation value according to a pixel number of the target image block; and perform a calibration operation on the target measured temperature to obtain a calibrated temperature value corresponding to the target according to at least the distance compensation value; and
a temperature reference device electrically connecting to the processor, wherein the temperature reference device is heated to a specified reference temperature, and the processor is configured to process on the measured thermal image to obtain a reference information corresponding to the temperature reference device, the reference information comprises a reference image block and a reference measured temperature corresponding to the reference image block, the processor calculates an environment compensation value according to the specified reference temperature and the reference measured temperature, and the calibrated temperature value is obtained by the processor performing the calibration operation on the target measured temperature according to the distance compensation value and the environment compensation value;
wherein the processor further stores a distance compensation table, the distance compensation table records a plurality of mapping relationships between a plurality of compared pixel numbers and a plurality of default distance compensation values, and the processor looks up the pixel number of the target image block in the distance compensation table to determine one of the plurality of default distance compensation values to serve as the distance compensation value.

11. The thermal image device of claim 10, wherein the processor sums the target measured temperature, the environment compensation value, and the distance compensation value to obtain the calibrated temperature value.

12. The thermal image device of claim 10, wherein the temperature reference device comprises a heat radiating element arranged to remain in the specified reference temperature and a heater arranged to heat the heat radiating element, the processor performs the operation on the measured thermal image to obtain at least one candidate reference block of the measured thermal image, a difference between a temperature of each candidate reference block and the specified reference temperature is smaller than or equal to a threshold, the processor compares a shape of said at least one candidate reference block with a shape of the heat radiating element to determine one of said at least one candidate reference block as the reference image block, and the processor calculates the reference measured temperature according to a pixel value of the reference image block.

13. The thermal image device of claim 10, wherein the processor sums the target measured temperature and the distance compensation value to obtain the calibrated temperature value.

14. The thermal image device of claim 10, wherein before being heated to the specified reference temperature, the temperature reference device is heated to a specified testing temperature;
a distance between the temperature reference device and the thermal image camera is a default distance;
the thermal image camera captures at the temperature reference device to obtain a testing thermal image;
the processor performs the operation to obtain a test reference information corresponding to the temperature reference device according to the testing thermal image;
the testing reference information comprises a reference image block and a reference measured temperature;
the processor updates the distance compensation table according to the testing reference information;
a pixel number of the reference image block is one of the plurality of compared pixel numbers; and
a difference value between the reference measured temperature and the specified testing temperature is one of the plurality of default distance compensation values.

15. The thermal image device of claim 10 further comprising a visible-light camera electrically connecting to the processor,
wherein the visible-light camera captures the monitored environment to obtain an optical image, and the processor performs the operation to determine the target image block according to the thermal image, the optical image and an object recognition model.

16. The thermal image device of claim 10, wherein the processor performs the operation to obtain the distance compensation value according to the pixel number of the target image block and a distance compensation function, and
the distance compensation function is a fitting curve representing a plurality of compared pixel numbers and a plurality of default distance compensation values.

17. The thermal image device of claim 16, the processor sums the target measured temperature and the distance compensation value to obtain the calibrated temperature value.

18. The thermal image device of claim 16, further comprising a temperature reference device, wherein before being heated to the specified reference temperature, the temperature reference device is heated to a specified testing temperature, and the thermal image device performs following steps:
adjusting the distance between the temperature reference device and the thermal image camera to a first default distance;
capturing, by the thermal image camera, at the temperature reference device to obtain a first testing thermal image;
processing, by the processor, on the first testing thermal image the operation to obtain a first reference information, wherein the first reference information corresponds to the temperature reference device and the first default distance, and the first reference information comprises a first reference image block and a first reference measured temperature;
calculating, by the processor, a first default distance compensation value, wherein the first default distance compensation value is a difference value between the first reference measured temperature and the specified testing temperature;
adjusting the distance between the temperature reference device and the thermal image camera to a second default distance;
capturing, by the thermal image camera, at the temperature reference device to obtain a second testing thermal image;
processing, by the processor, on the second testing thermal image to obtain a second reference information, wherein the second reference information corresponds to the temperature reference device and the second default distance, and the second reference information comprises a second reference image block and a second reference measured temperature;
calculating, by the processor, a second default distance compensation value, wherein the second default distance compensation value is a difference value between the second reference measured temperature and the specified testing temperature; and
performing, by the processor, a curve fitting operation to obtain the distance compensation function according to a pixel number of the first reference image block, a pixel number of the second reference image block, the first default distance compensation value, and the second default distance compensation value.

* * * * *